US010119531B2

(12) United States Patent
Chou (10) Patent No.: US 10,119,531 B2
(45) Date of Patent: Nov. 6, 2018

(54) INFLATOR HAVING AN ENHANCED COOLING EFFECT ON A MOTOR THEREOF

(71) Applicant: Wen-San Chou, Tainan (TW)

(72) Inventor: Wen-San Chou, Tainan (TW)

( * ) Notice: Subject to any disclaimer, the term of this patent is extended or adjusted under 35 U.S.C. 154(b) by 372 days.

(21) Appl. No.: 14/983,573

(22) Filed: Dec. 30, 2015

(65) Prior Publication Data

US 2016/0208789 A1    Jul. 21, 2016

(30) Foreign Application Priority Data

Jan. 15, 2015   (TW) .............................. 104101376 A (51) Int. Cl.

| F04B 39/06 | (2006.01) |
|---|---|
| F04B 53/16 | (2006.01) |
| F04B 35/04 | (2006.01) |
| F04D 25/06 | (2006.01) |
| F04D 29/58 | (2006.01) |
| F04B 35/06 | (2006.01) |
| F04B 39/12 | (2006.01) |
| F04D 25/08 | (2006.01) |
| H02K 9/06 | (2006.01) |
| F04B 53/14 | (2006.01) |
| F04D 19/00 | (2006.01) |
| H02K 5/20 | (2006.01) |

(52) U.S. Cl.
CPC ............ *F04B 39/066* (2013.01); *F04B 35/04* (2013.01); *F04B 35/06* (2013.01); *F04B 39/121* (2013.01); *F04B 39/122* (2013.01); *F04B 53/14* (2013.01); *F04D 19/002* (2013.01); *F04D 25/06* (2013.01); *F04D 25/082* (2013.01); *F04D 29/5806* (2013.01); *H02K 5/20* (2013.01); *H02K 9/06* (2013.01)

(58) Field of Classification Search
CPC ........ F04B 35/04; F04B 35/06; F04B 39/066; F04B 39/121; F04B 39/12; F04B 39/122; F04B 53/16; F04B 53/14; H02K 5/20; H02K 9/06; H02K 9/14; H02K 9/16; H02K 9/28; F04D 25/06; F04D 25/082; F04D 29/5806
See application file for complete search history.

(56) References Cited

U.S. PATENT DOCUMENTS

| 6,631,888 | B1 * | 10/2003 | Prueter | ................... A61L 9/122 |
|---|---|---|---|---|
| | | | | 239/57 |
| 8,522,833 | B2 * | 9/2013 | Chou | ..................... F04B 35/008 |
| | | | | 141/38 |
| 9,879,665 | B2 * | 1/2018 | Chou | ...................... F04B 35/06 |
| 9,957,966 | B2 * | 5/2018 | Chou | ...................... F04D 19/002 |

* cited by examiner

*Primary Examiner* — Nathan Zollinger (57) ABSTRACT

An inflator having an enhanced cooling effect on its motor is disclosed, which includes a box composed a cover and a base, and a compressor unit installed in the box. The box is provided with airflow-guiding members cooperated with a cooling fan fitted at a rotating shaft of a motor used in the compressor unit to allow outside air to be quickly drawn into the interior of the box. Thereafter, the airflow can be guided by the airflow-guiding members to enter the interior of the motor to dissipate the heat generated by the rotor assembly in the motor and finally go out of the box. Therefore, heat is not easy to accumulate in the motor, so that maximum power output of the motor can be achieved, and the performance and service life of the motor can be increased.

5 Claims, 7 Drawing Sheets

FIG. 7

INFLATOR HAVING AN ENHANCED COOLING EFFECT ON A MOTOR THEREOF

(a) TECHNICAL FIELD OF THE INVENTION

The present invention relates to an inflator having an enhanced cooling effect on its motor, which generally comprises a box and a compressor unit installed in the box, wherein the box is provided with air-guiding members which can guide the airflow to quickly enter the motor's housing and then go out of the housing, thus taking away the heat generated by the rotor assembly in the motor; therefore, heat is not easy to accumulate in the motor, so that the performance and service life of the motor can be increased.

(b) DESCRIPTION OF THE PRIOR ART

Air compressors are usually employed to inflate objects such as air cushions or tires. Generally, portable air compressors are manufactured in small size, so that they can be carried easily. Furthermore, a portable air compressor can be powered by a handheld DC power supply or a cigarette lighter socket in a vehicle. Conventionally, a portable air compressor employs a box to accommodate a compressor unit therein, wherein the compressor unit employs a motor to drive a piston body to conduct reciprocating motion in a cylinder to produce compressed air, which can be transferred to an object that needs to be inflated. In operation, heat may be accumulated in the box. Since a motor includes therein a rotor assembly, which contains an armature core formed by an iron core wound with enameled wire, a commutator, and a brush unit, heat is easy to accumulate in the motor's housing. The heat accumulated in the armature core may cause the brush unit to leave more carbon deposits, thus affecting the electrical circuit of the motor. Besides, high temperature resulting from the armature core may reduce the magnetic intensity of the magnets used in the motor. Thus, the performance of the motor can be reduced.

Currently, emergency repair kits, which employ a low-power motor, are used to repair punctured tires. However, in some countries, the Traffic Act stipulates that, when a vehicle has a punctured tire on a highway, the driver should repair the punctured tire within a specified period and should immediately drive away after the repair is completed to prevent rearward bump. Under these circumstances, for completing the repair as soon as possible, the motor of the compressor unit of an emergency repair kit should be operated at a higher speed. However, if heat accumulated in the motor's housing cannot be quickly taken away, the performance of the motor will decrease. Even worse, the enameled wire of the armature core will probably be damaged to cause a short circuit, and thus the motor may be burn out.

In conventional inflators, a compressor unit and its motor are supported in a box through partitioning walls. However, the box is not structured to assist dissipating heat in the motor. Thus, the box is easy to accumulate the heat generated by the motor, and thus the performance of the motor can be reduced or the motor can be damaged.

SUMMARY OF THE INVENTION

One object of the present invention is to provide an inflator, which has an enhanced cooling effect on its motor. The inflator generally comprises a box and a compressor unit, wherein the compressor unit is installed in the box composed of a cover and a base. The cover is provided with an upper airflow-guiding member. The base is provided with a lower airflow-guiding member. The upper and lower airflow-guiding members can support the motor's housing of the compressor unit. In addition, the upper and lower airflow-guiding members can guide the airflow to quickly pass through two opposite openings of the motor's housing and then go out of the motor's housing via downstream through openings defined at the rear end of the motor's housing, thus taking away the heat generated by the rotor assembly in the motor. Therefore, heat is not easy to accumulate in the motor, so that the performance and service life of the motor can be increased.

Other objects, advantages, and novel features of the present invention will become more apparent from the following detailed description when taken in conjunction with the accompanying drawings.

DETAILED DESCRIPTION OF THE PREFERRED EMBODIMENTS

Figure 1:
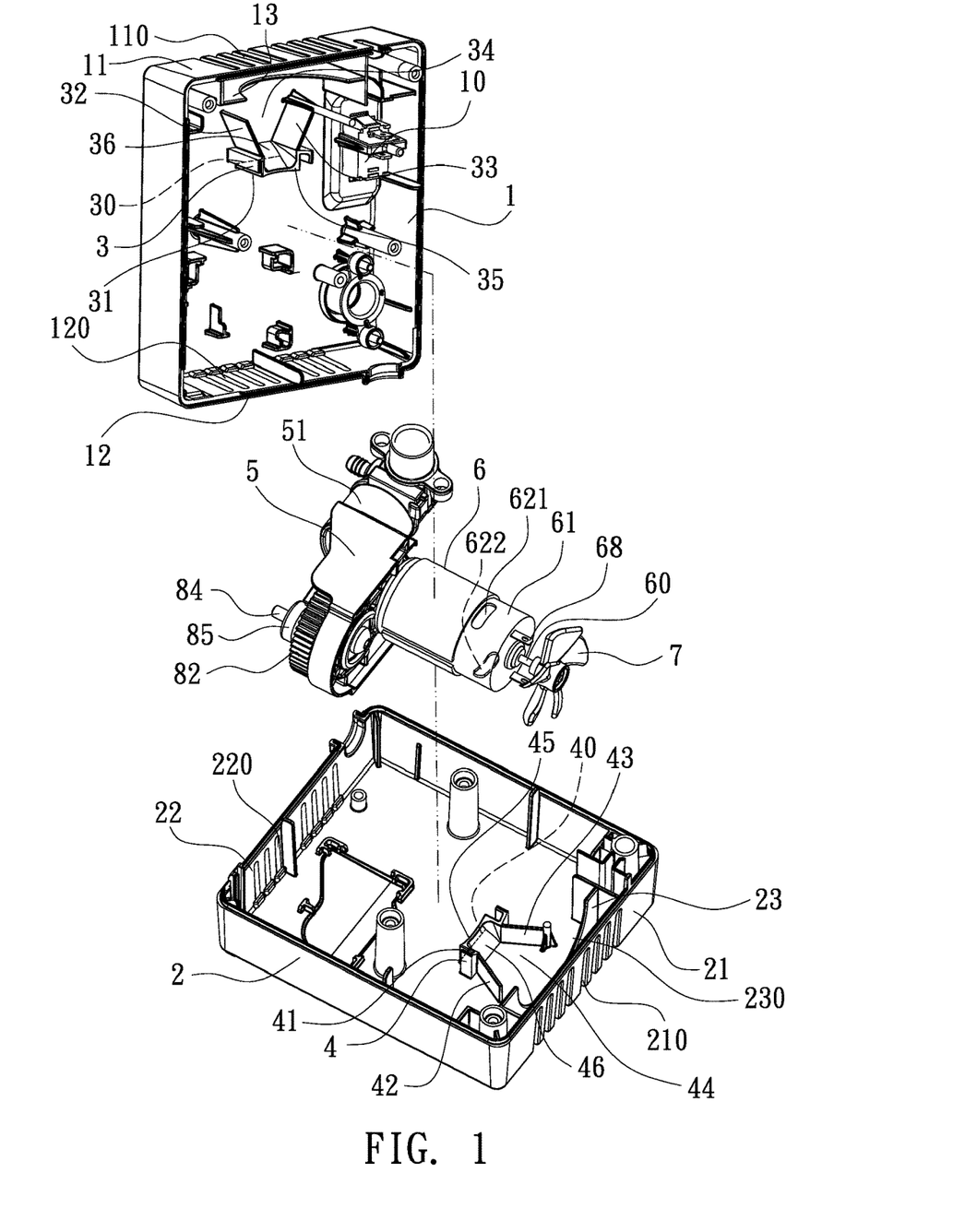
FIG. 1 shows an exploded view of an inflator according to one embodiment of the present invention.
Figure 2:
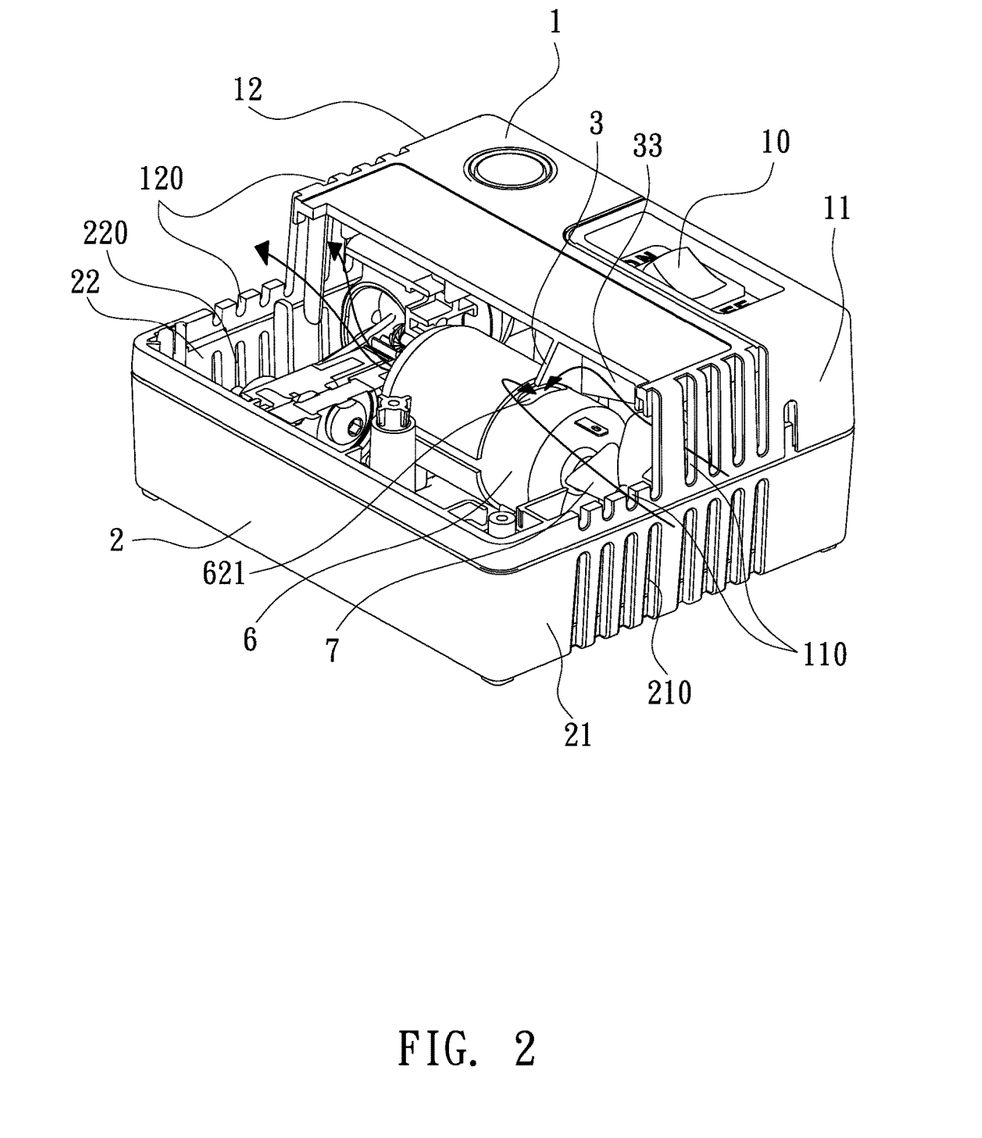
FIG. 2 shows a 3-dimensionally sectional view of the inflator.

Referring to FIGS. 1 and 2, an inflator according to one embodiment of the present invention is shown, which generally comprises a box and a compressor unit. The box is composed of a cover 1 and a base 2. The compressor unit is installed in the box.

Figure 6:
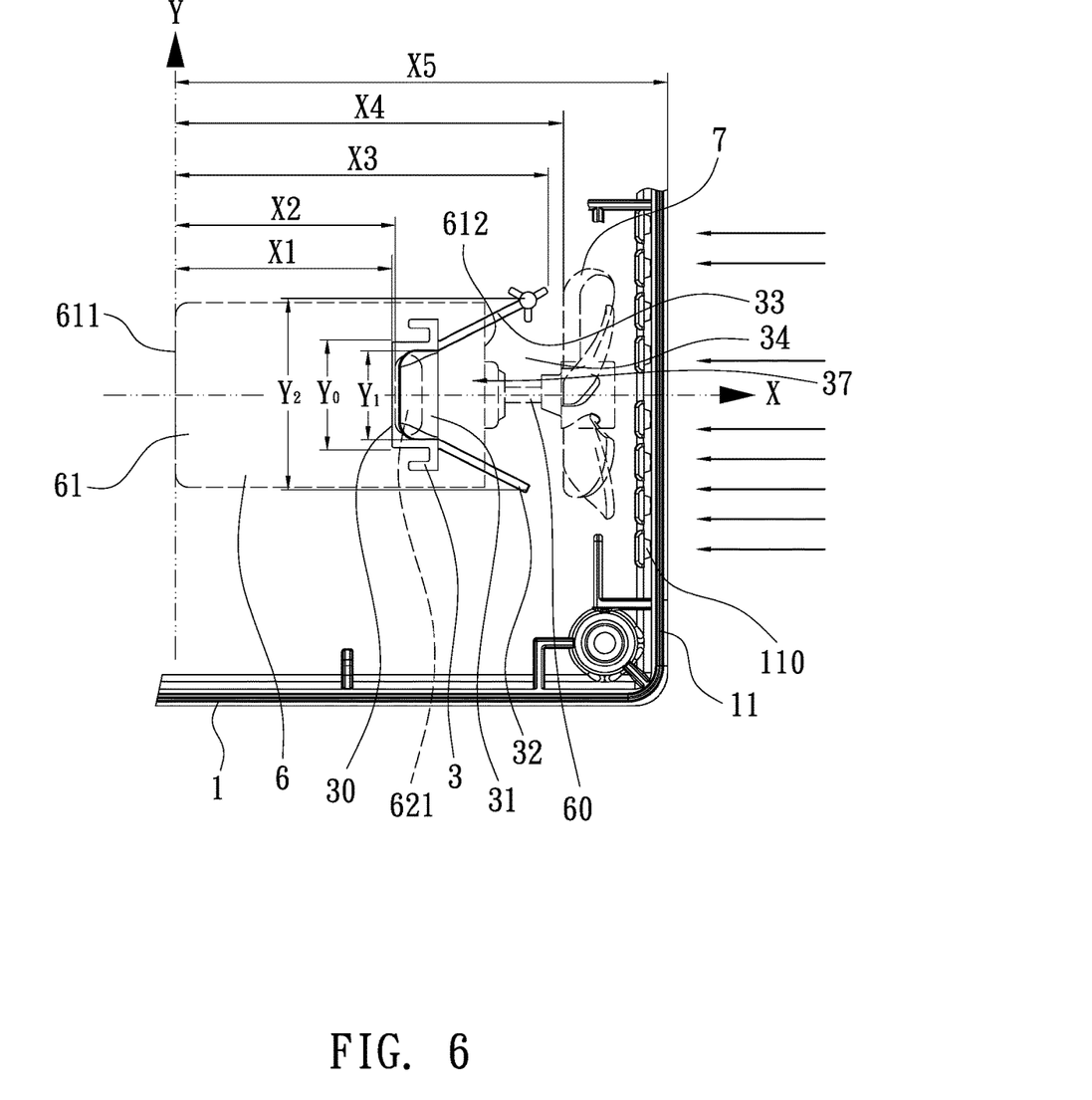
FIG. 6 shows a schematic plan view of the inflator, which shows the relative positions of the upper airflow-guiding member, one opening of the motor's housing, the cooling fan, and the second slits.
Figure 7:
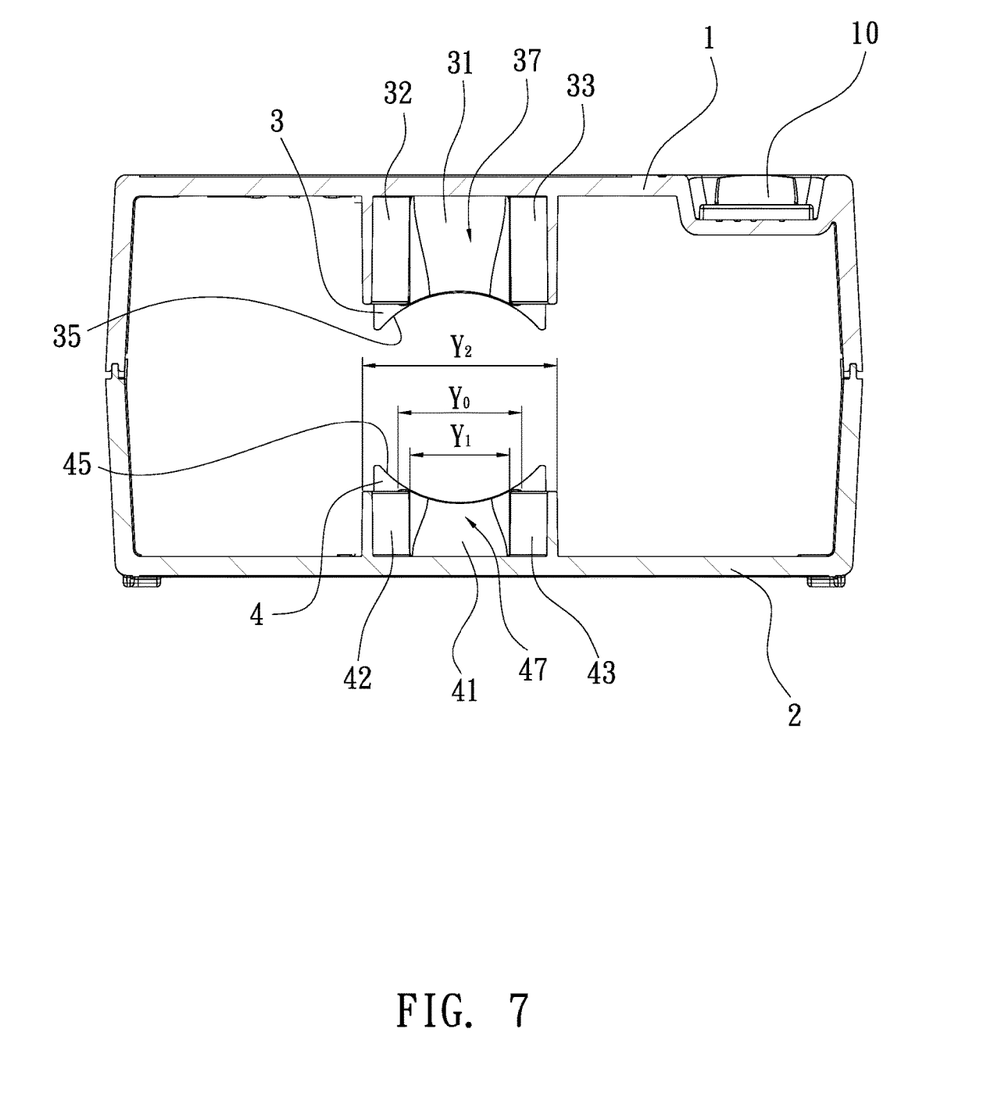
FIG. 7 shows another sectional view of the inflator.

The cover 1, which has a rectangular shape, is provided with a switch 10 for starting and stopping the compressor unit. The cover 1 has a front wall 11 and a rear wall 12, wherein the front wall defines multiple first slits 110 to serve as an air entrance port; the rear wall 12 defines multiple second slits 120 to serve as an air exit port. Particularly, the inner surface of the cover 1 is provided with an upper airflow-guiding member 3. The upper airflow-guiding member 3 has an upper interception wall 31, which extends downwardly from the inner surface of the cover 1. The upper interception wall 31 and the cover 1 are intersected at a line 30, which has a length of (Y0) (see FIGS. 6 and 7). The upper interception wall 31 can intercept the airflow in the box, as will be fully described later. Furthermore, the upper airflow-guiding member 3 has two upper air guiding plates 32, 33 respectively at two opposite sides of the upper interception wall 31, extending towards the front wall 11 of the cover 1, wherein the two upper air guiding plates 32, 33 may be perpendicular to the upper interception wall 31 or not. Therefore, an air guiding channel 37 is defined between the inner surface of the cover 1, the upper interception wall 31, and the two upper air guiding plates 32, 33. If the upper air guiding plates 32, 33 are perpendicular to the upper interception wall 31, the air guiding channel 37 will appear as a U-shaped channel (not shown in the drawings). If the upper air guiding plates 32, 33 extend outwardly from each other, towards the front wall 11 of the cover 1 (i.e. they are not perpendicular to the upper interception wall), the guiding channel 37 will appear as a V-shaped channel which can facilitate guiding the airflow in the box. Specifically, as shown in FIGS. 6 and 7, each of the upper air guiding plates 32, 33 has a first end, which is joined with one side of the upper interception wall 31, and a second end opposite to the first end. The gap between the second ends of the two upper air guiding plates 32, 33 can be worked as an air entrance 34. As shown, the distance between the first ends of the upper air guiding plates 32, 33 is labeled with (Y1). The distance between the second ends of the upper air guiding plates 32, 33 is labeled with (Y2), wherein the relationship of Y2>Y1 and Y2>Y0 is fulfilled. Furthermore, the cover 1 is provided with an upper wall 13 which is parallel to the front wall 11 and has a concave bottom, wherein the upper wall 13 is located behind the front wall 11. The upper interception wall 31 of the upper airflow-guiding member 3 is formed into a curved portion 35 at its bottom to serve as a support for the motor's housing 61. The upper interception wall 31 of the upper airflow-guiding member 3 has a slant surface 36, which faces towards the front wall 11 to facilitate guiding the airflow in the box.

The base 2 has a rectangular shape corresponding to the cover 1. The base 2 has a front wall 21, which can be aligned with the front wall 11 of the cover 1, and a rear wall 22, which can be aligned with the rear wall 12 of the cover 1, wherein the front wall 21 defines multiple first slits 210 to serve as an air entrance port; the rear wall 22 defines multiple second slits 220 to serve as an air exit port. Particularly, the inner surface of the base 2 is provided with a lower airflow-guiding member 4, which has the same structure as the upper airflow-guiding member 3. The lower airflow-guiding member 4 has a lower interception wall 41, which extends upwardly from the inner surface of the base 2. The lower interception wall 41 and the base 2 are intersected at a line 40, which also has a length of (Y0) (see FIG. 7). The lower interception wall 41 can intercept the airflow in the box, as will be fully described later. Furthermore, the lower airflow-guiding member 4 has two lower air guiding plates 42, 43 respectively at two opposite sides of the lower interception wall 41, extending towards the front wall 21 of the base 2, wherein the two lower air guiding plates 42, 43 may be perpendicular to the lower interception wall 41 or not. Therefore, an air guiding channel 47 is defined between the inner surface of the base 2, the lower interception wall 41, and the two lower air guiding plates 42, 43. If the lower air guiding plates 42, 43 are perpendicular to the lower interception wall 41, the air guiding channel 47 will appear as a U-shaped channel (not shown in the drawings). If the lower air guiding plates 42, 43 extend outwardly from each other, towards the front wall 21 (i.e. they are not perpendicular to the lower interception wall), the guiding channel 47 will appear as a V-shaped channel which can facilitate guiding the airflow in the box. Specifically, as shown in FIG. 7, each of the lower air guiding plates 42, 43 has a first end, which is joined with one side of the lower interception wall 41, and a second end opposite to the first end. The gap between the second ends of the two lower air guiding plates 42, 43 can be worked as an air entrance 44. As shown, the distance between the first ends of the lower air guiding plates 42, 43 is labeled with (Y1). The distance between the second ends of the lower air guiding plates 42, 43 is labeled with (Y2), wherein the relationship of Y2>Y1 and Y2>Y0 is fulfilled. Furthermore, the base 2 is provided with a lower wall 23 which is parallel to the front wall 21 and has a concave top, wherein the lower wall 23 is located behind the front wall 21. The lower interception wall 41 of the lower airflow-guiding member 4 is formed into a curved end portion 45 at its top to serve as a support for the motor's housing 61. The lower interception wall 41 of the lower airflow-guiding member 4 has a slant surface 46, which faces towards the front wall 21 to facilitate guiding the airflow in the box.

Although the compressor unit is not a primary feature sought to be patented, for illustrating the technique and advantages of the present invention, the compressor unit and the motor 6 thereof will described briefly. Referring to FIGS. 2 through 5, the compressor unit, which can be installed between the cover 1 and the base 2, includes a main frame 5, a cylinder 51 joined with the main frame 5, a motor 6 mounted at the main frame 5, and a transmission mechanism including a pinion 81 and a gear 82, wherein the cylinder 51 is fitted with a piston body 85. The motor 6 is provided in its housing 61 with a rotor assembly 64, which includes a rotating shaft 60, an armature core having an iron core 65 wound with enameled wire 66, a commutator 67, an electrical terminal 68, and a brush unit 69. One end of the rotating shaft 60 is mounted with the pinion 81, which is located near the front end 611 of the motor's housing 61 (see also FIG. 6). The other end of the rotating shaft 60 is mounted with the cooling fan 7, which is located near the rear end 612 of the motor's housing 61 (see also FIG. 6). The housing 61 of the motor 6 defines at its circumference with two opposite openings 621, 622, which respectively corresponds to the upper and lower airflow-guiding members 3, 4, and defines a plurality of downstream through holes 63 at its rear end (see FIG. 5). The gear 82 is attached with a counterweight 83 which is provided with a crankshaft and a crankpin 84, wherein the crankshaft is rotatably connected to the main frame 5, and the crankpin 84 is connected with the piston body 85. The pinion 81 is engaged with the gear 82. The motor 6 is installed in the box such that the curved portions 35, 45 of the upper and lower airflow-guiding members 3, 4 can firmly hold the housing 61 of the motor 6 within the box, so that the motor will not become loose, tilt or overturn. In operation, the motor 6 can drive the pinion 81 to rotate the gear 82, which in turn can drive the piston body 85 to conduct reciprocating motion in the cylinder 51 through the crankpin 84 attached to the counterweight 83.

FIG. 6 shows the motor 6 being held between the upper and lower airflow-guiding members 3, 4 of the box, wherein the rear end 612 of the motor's housing 61 faces towards the first slits 110, 210, and the front end 611 of the motor's housing 61 faces towards the second slits 120, 220. The outer surface of the front end 611 of the motor's housing 61 is used as a vertical reference line (Y). The rotating shaft 60 of the motor 6 is used as a horizontal reference line (X). Thus, the front end 611 is at the location of X=0. As shown, the intersected lines 30, 40 of the upper and lower airflow-guiding members 3, 4 are located at a horizontal distance of (X1) from the vertical reference line (Y). The two opposite openings 621, 622 of the motor's housing 61 are located at a horizontal distance of (X2) from the vertical reference line (Y). The second ends of the upper and lower guiding plates 32, 33, 42, 43 are located at a horizontal distance of (X3) from the vertical reference line (Y). The cooling fan 7 is located at a horizontal distance of (X4) from the vertical reference line (Y). The first slits 110, 210 of the box are located at a horizontal distance of (X5) from the vertical reference line (Y). Among them, the relationship of X1<X2<X3<X4<X5 is fulfilled.

Figure 3:
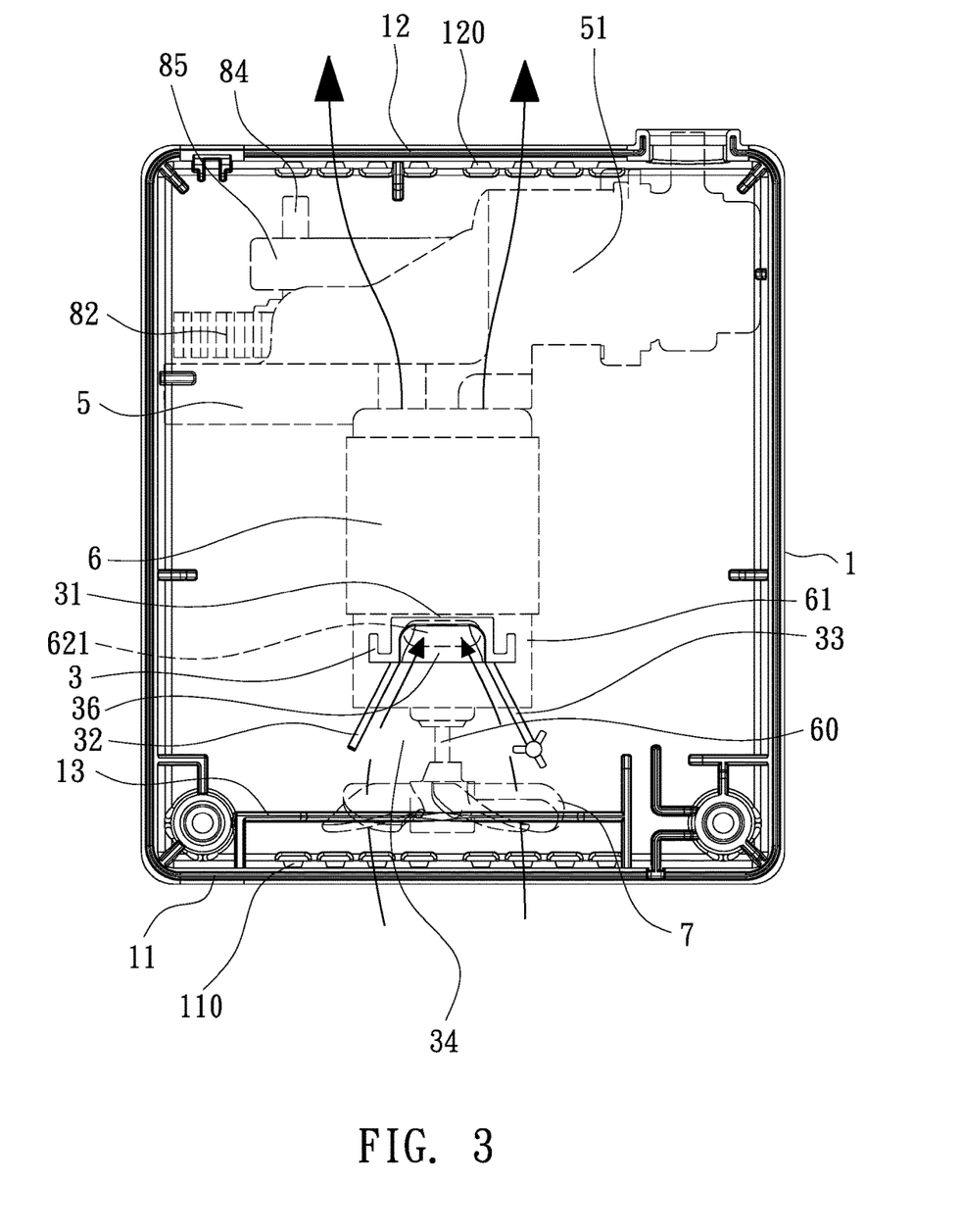
FIG. 3 shows a top view of the inflator.
Figure 4:
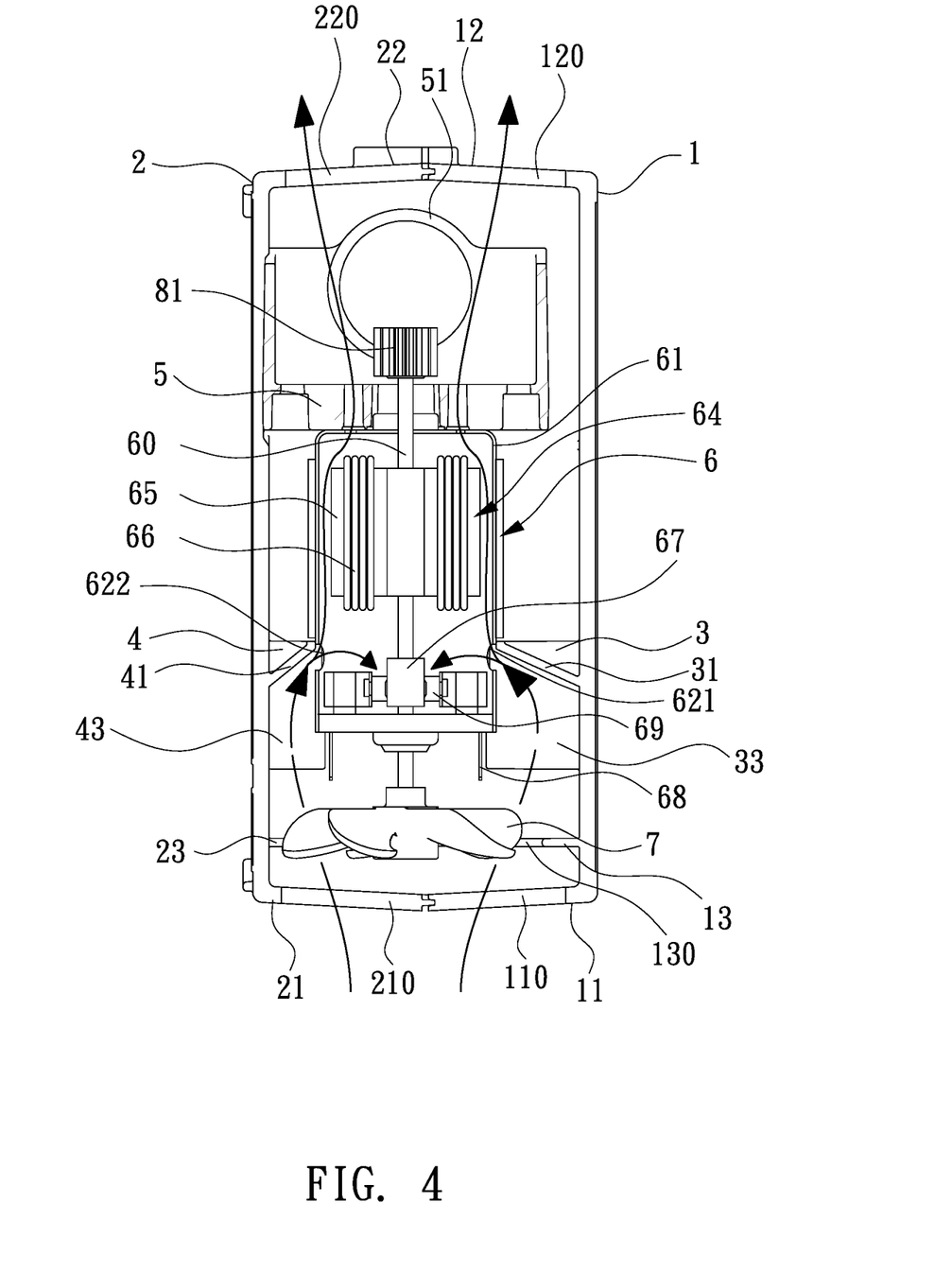
FIG. 4 shows a sectional view of the inflator.
Figure 5:
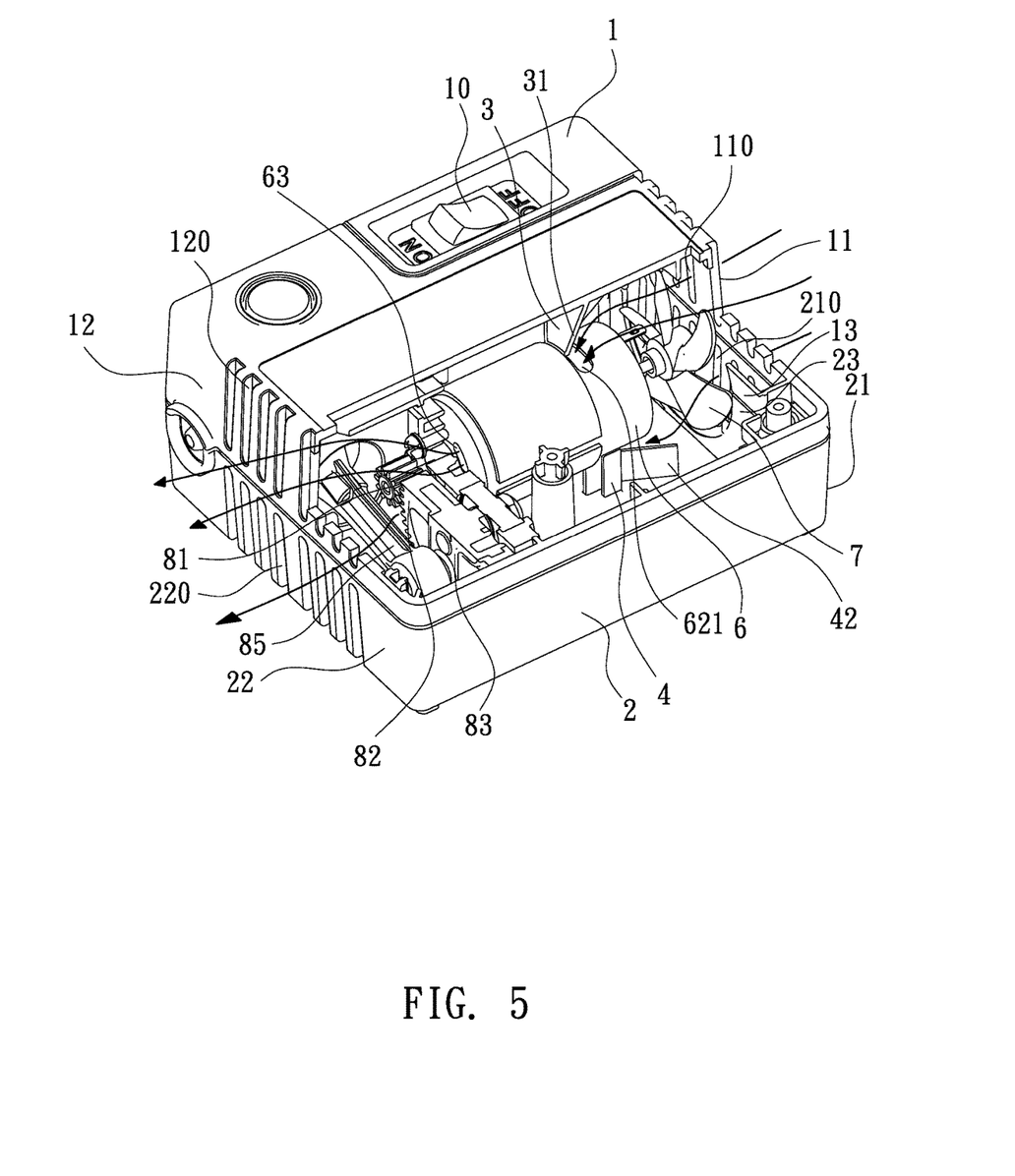
FIG. 5 shows a 3-dimensionally sectional view of the inflator, wherein the airflow induced by the cooling fan for dissipating the heat generated by the motor is demonstrated.

FIGS. 3 and 5 schematically show the airflow induced by the cooling fan 7 for dissipating the heat generated by the compressor unit, wherein the curved portions 35, 45 of the upper and lower airflow-guiding members 3, 4 can contact the motor's housing 61 at a location slightly behind the two openings 621, 622 of the motor's housing 61, so that the two openings 621, 622 are respectively located within the upper and lower air guiding channels 37, 47. In operation, the cooling fan 7 can be rotated by the motor 6 to draw outside air to enter the box via the first slits 110, 210 and then flow through the round opening, composed of an upper part 130 and a lower part 230, defined by the upper and lower plates 13, 23 for obtaining a smooth airflow, which then flows through the air entrance 34 between the two upper V-shaped air guiding plates 32, 33 and the air entrance 44 between the lower V-shaped air guiding plates 42, 43 and then is guided by the slant surfaces 36, 46 of the interception walls 31, 41 to enter the two opposite openings 621, 622 of the motor's housing 61, wherein the airflow can move towards the rear end 612 of the motor's housing 61, so that the heat generated by the commutator 67, the brush unit 69, and the iron core 65 with the enameled wire 66 can be dissipated effectively (see also FIG. 4).

As a summary, the upper and lower airflow-guiding members 3, 4 of the box can serve as a support for fixing the motor 6 in the box. In addition, the upper and lower airflow-guiding members 3, 4 of the box facilitate guiding the airflow induced by the cooling fan 7 to pass through the openings 621, 622 of the motor's housing 61 to take the heat generated by the rotor assembly 64 away via the downstream through openings 63 of the motor's housing 61, so that heat is not easy to accumulate in the motor 6, and thus maximum power output of the motor 6 can be achieved. Therefore, the performance and service life of the motor can be increased. These features render the present invention advantageous over the prior art.

I claim:

1. In an inflator including a box composed of a cover and a base, and a compressor unit installed in the box, wherein the cover has a front wall and a rear wall, and the base has a front wall aligned with the front wall of the cover, and a rear wall aligned with the rear wall of the cover, the front walls of the cover and the base defining multiple first slits to serve as an air entrance port, the rear walls of the cover and the base defining multiple second slits to serve as an air exit port, the compressor unit including a motor having a rotating shaft, one end of which is provided with a cooling fan for drawing outside air into the interior of the box via the first slits, the motor defining two opposite openings on its housing; wherein the improvements comprises: the cover is provided with an upper airflow-guiding member, and the base is provided with a lower airflow-guiding member, the upper and lower air flow-guiding members respectively contacting the housing of the motor at a location slightly behind the two opposite openings for supporting the motor's housing and guiding the airflow induced by the cooling fan to enter the motor's housing via the two opposite openings, so that heat is not easy to accumulate in the motor, wherein the upper airflow-guiding member has an upper interception wall extending downwardly from an inner surface of the cover, the upper interception wall and the cover being intersected at a line having a length (Y0); the lower airflow-guiding member has a lower interception wall extending upwardly from an inner surface of the base, the lower interception wall and the base being intersected at a line having a length (Y0); wherein the upper and lower interception walls are capable of intercepting the airflow induced by the cooling fan for guiding the airflow to enter the motor's housing, the upper interception wall of the upper airflow-guiding member is formed into a curved portion at its bottom and has a slant surface facing towards the front wall of the cover; the lower interception wall of the lower airflow-guiding member is formed into a curved portion at its top and has a slant surface facing towards the front wall of the base, the curved portions of the upper and lower interception walls capable of contacting the housing of the motor to fix the motor in the box, the slant surfaces of the upper and lower interception walls facilitating the airflow induced by the cooling fan to pass through the two opposite openings of the motor's housing.

2. In an inflator including a box composed of a cover and a base, and a compressor unit installed in the box, wherein the cover has a front wall and a rear wall, and the base has a front wall aligned with the front wall of the cover, and a rear wall aligned with the rear wall of the cover, the front walls of the cover and the base defining multiple first slits to serve as an air entrance port, the rear walls of the cover and the base defining multiple second slits to serve as an air exit port, the compressor unit including a motor having a rotating shaft, one end of which is provided with a cooling fan for drawing outside air into the interior of the box via the first slits, the motor defining two opposite openings on its housing; wherein the improvements comprises: the cover is provided with an upper airflow-guiding member, and the base is provided with a lower airflow-guiding member, the upper and lower air flow-guiding members respectively contacting the housing of the motor at a location slightly behind the two opposite openings for supporting the motor's housing and guiding the airflow induced by the cooling fan to enter the motor's housing via the two opposite openings, so that heat is not easy to accumulate in the motor, wherein the upper airflow-guiding member has an upper interception wall extending downwardly from an inner surface of the cover, the upper interception wall and the cover being intersected at a line having a length (Y0); the lower airflow-guiding member has a lower interception wall extending upwardly from an inner surface of the base, the lower interception wall and the base being intersected at a line having a length (Y0); wherein the upper and lower interception walls are capable of intercepting the airflow induced by the cooling fan for guiding the airflow to enter the motor's housing, the upper airflow-guiding member has two upper air guiding plates respectively at two opposite sides of the upper interception wall, the two plates extending towards the front wall of the cover to define an upper air guiding channel between the upper interception wall and the two air guiding plates; the lower airflow-guiding member has two lower air guiding plates respectively at two opposite sides of the lower interception wall, the two plates extending towards the front wall of the base to define a lower air guiding channel between the lower interception wall and the two lower air guiding plates; wherein the two opposite openings of the motor's housing are respectively located within the upper air guiding channel and the lower air guiding channel.

3. The inflator of claim 2, wherein the two upper air guiding plates extend outwardly from each other, towards the front wall of the cover, so that the upper air guiding channel is appeared as a V-shaped channel; the lower air guiding plates extend outwardly from each other, towards the front wall of the base, so that the lower air guiding channel is appeared as a V-shaped channel; whereby the V-shaped upper and lower guiding channels facilitate guiding the airflow induced by the cooling fan to enter the two opposite openings of the motor's housing.

4. The inflator of claim 3, wherein each of the upper air guiding plates has a first end, which is joined with one side of the upper interception wall, and a second end opposite to the first end; each of the lower air guiding plates has a first end, which is joined with one side of the lower interception wall, and a second end opposite to the first end; wherein the distance between the first ends of the upper air guiding plates or the lower air guiding plates is (Y1); the distance between the second ends of the upper air guiding plates or the lower air guiding plates is (Y2), wherein (Y2) is greater than (Y1), and (Y2) is greater than (Y0).

5. The inflator of claim 4, wherein the motor is located within the box such that the front end of the motor's housing faces towards the rear walls of the box, and the rear end of the motor's housing faces towards the front walls of the box, the cooling fan being located near the rear end of the motor's housing, wherein the intersected lines of the upper and lower airflow-guiding members are located at a horizontal distance of (X1) from a vertical reference line (Y) passing through the front end of the motor's housing, the two opposite openings of the motor's housing are located at a horizontal distance of (X2) from the vertical reference line (Y), the second ends of the upper and lower guiding plates are located at a horizontal distance of (X3) from the vertical reference line (Y), the cooling fan is located at a horizontal distance of (X4) from the vertical reference line (Y), and the first slits of the box are located at a horizontal distance of (X5) from the vertical reference line (Y), wherein the relationship of X1<X2<X3<X4<X5 is fulfilled.

* * * * *